United States Patent [19]
Yonehara et al.

[11] Patent Number: 5,058,104
[45] Date of Patent: Oct. 15, 1991

[54] TDM DEMULTIPLEXER WITH DEDICATED MAINTENANCE CHANNELS TO INDICATE HIGH-SPEED LINE FAULTS TO LOW SPEED CIRCUITS

[75] Inventors: Akifumi Yonehara; Yoshio Yokose, both of Tokyo, Japan

[73] Assignee: NEC Corporation, Tokyo, Japan

[21] Appl. No.: 380,864

[22] Filed: Jul. 17, 1989

[30] Foreign Application Priority Data

Jul. 26, 1988 [JP] Japan ................................ 63-184727

[51] Int. Cl.[5] .............................................. H04J 3/14
[52] U.S. Cl. ........................................ 370/14; 370/13; 370/68.1; 370/80; 370/110.1; 370/112; 371/20.1; 340/825.36
[58] Field of Search ...................... 370/112, 13, 110.1, 370/16, 80, 84, 17, 14, 68, 68.1; 371/20.1, 71, 2; 340/825.36

[56] References Cited

U.S. PATENT DOCUMENTS

| | | | |
|---|---|---|---|
| 4,347,600 | 8/1982 | Abbott et al. | 370/13 |
| 4,567,587 | 1/1986 | McDermott | 370/13 |
| 4,815,074 | 3/1989 | Jacobsen | 370/112 |
| 4,858,224 | 8/1989 | Nakano et al. | 370/13 |

Primary Examiner—Douglas W. Olms
Assistant Examiner—Alpus H. Hsu
Attorney, Agent, or Firm—Laff, Whitesel, Conte & Saret

[57] ABSTRACT

In a channel bank at one of TDM hierarchical levels, a TDM demultiplexer includes a plurality of high-speed interfaces connected respectively to high-speed digital transmission lines. Each interface receives detects a line fault and appends an alarm signal of a time-slot duration to time slots of digital signals. The outputs of the high-speed interfaces are multiplexed into a TDM frame sequence and the time slots of data signals in that TDM frame sequence are interchanged according to a prescribed rule. The slot-interchange frame sequence is demultiplexed into plurality of TDM signals greater in number than the number of the high-speed interfaces. Low-speed interfaces respectively receive the demultiplexed TDM signals to detect the time slot in which the alarm signal is contained and transmits a line fault signals to a respective one of low-speed transmission lines.

2 Claims, 3 Drawing Sheets

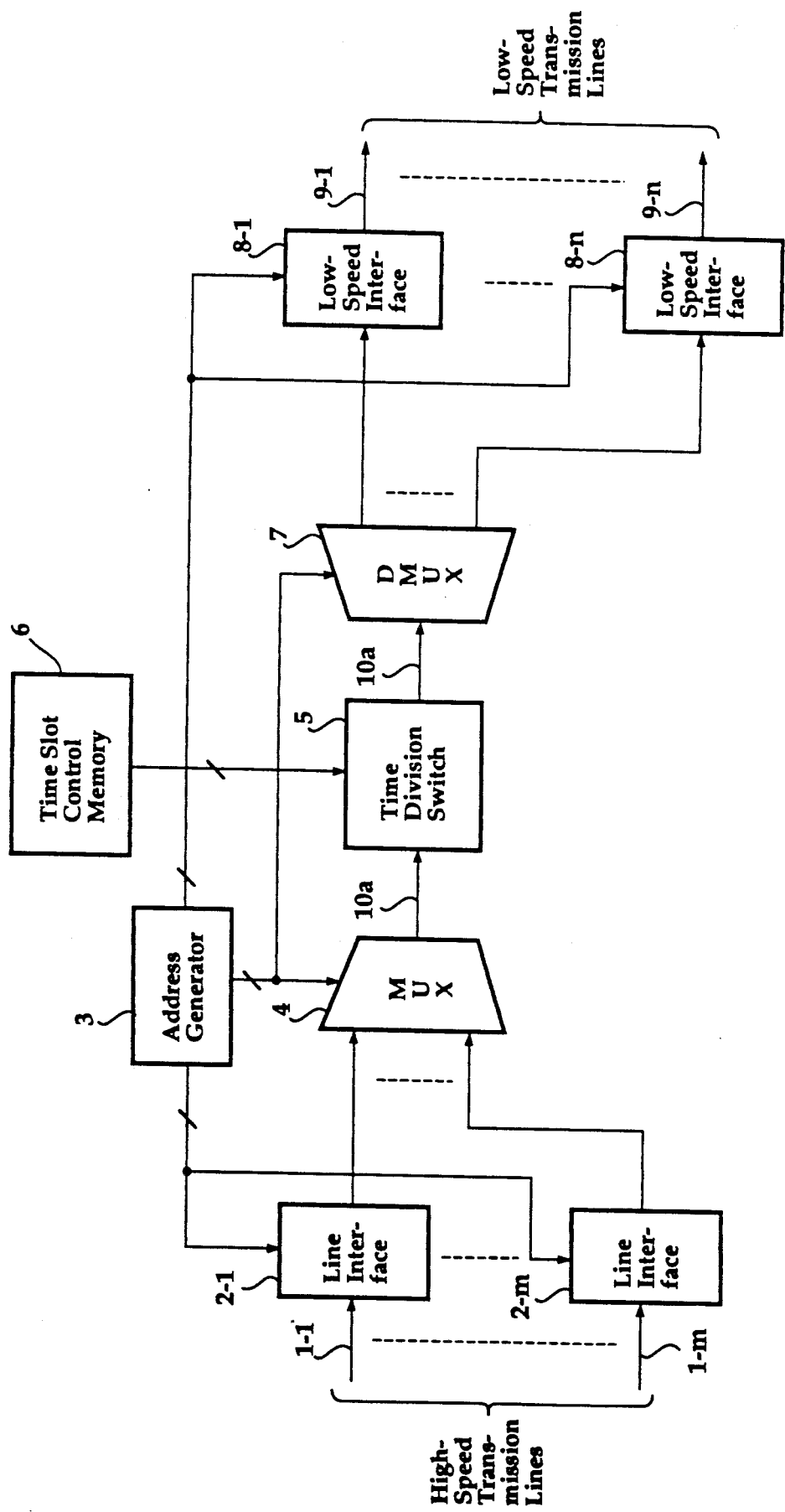

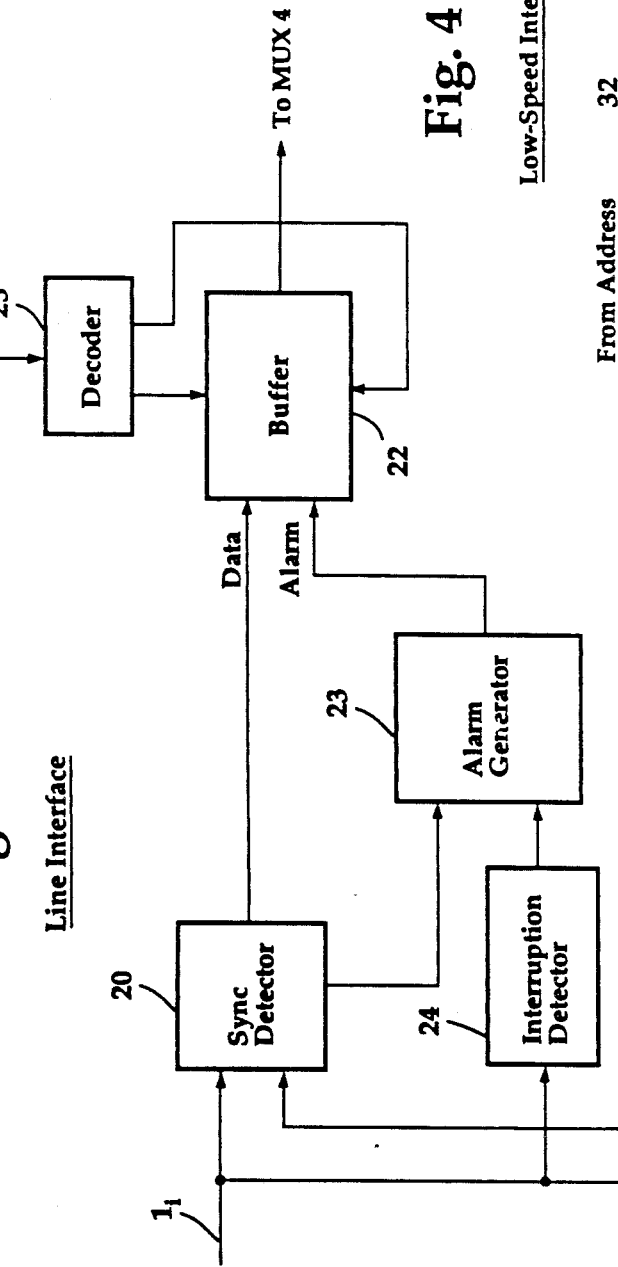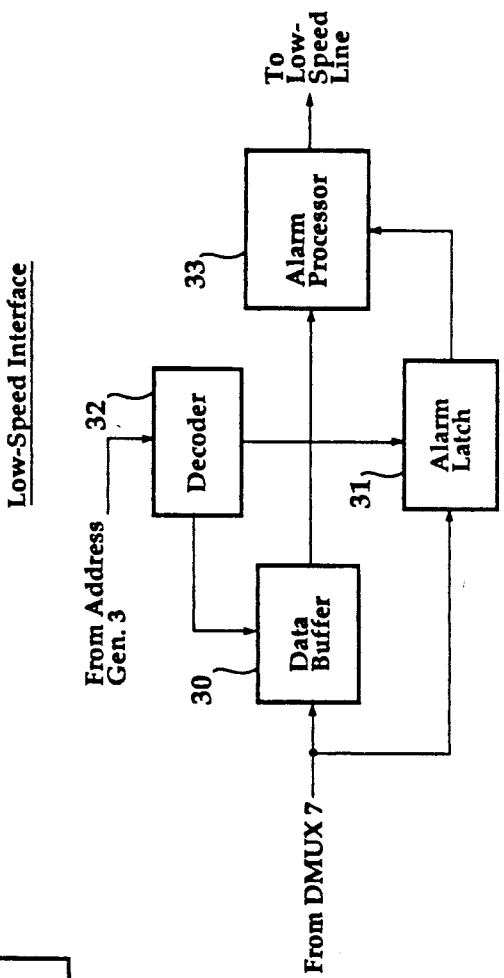

TDM DEMULTIPLEXER WITH DEDICATED MAINTENANCE CHANNELS TO INDICATE HIGH-SPEED LINE FAULTS TO LOW SPEED CIRCUITS

BACKGROUND OF THE INVENTION

The present invention relates generally to channel banks for digital transmission, and more particularly to maintenance of digital circuits of a TDM (time-division multiplex) demultiplexer at one of the TDM hierarchical levels.

As illustrated in FIG. 1, a TDM demultiplexer currently employed at the primary level of the TDM hierarchy includes a plurality of line interfaces 50 at which incoming signals are received through high-speed digital transmission lines. Each line interface 50 is provided with a fault detector 51 which detects a fault in the associated transmission line. A clamp circuit 52 is connected in the transmission line to clamp it to a specified logic level or a series of different logic levels in response to the detection of a line fault by the fault detector 51. The outputs of the clamp circuits 52 are coupled to a time division multiplexer 53 where the incoming signals are multiplexed into a series of TDM frames, which is applied to a time division switch 54. In response to a switching signal from a time slot memory 55, the time slots of each incoming frame are interchanged by the time division switch 54 according to predetermined relationships between the incoming time slots of the high-speed digital circuits and the outgoing time slots of low-speed analog circuits. The slot-interchanged TDM frames are demultiplexed by demultiplexer 56 into individual frames, which are supplied respectively to low-speed interfaces 57 to which the analog circuits are terminated. Each of the low-speed interfaces constantly monitors the incoming signal and, on detecting a continuous string of specified logic levels, recognizes that a line fault has occurred in the associated high-speed digital circuit and sends a line-fault indication to the associated low-speed circuit. In some applications, time division switch 54 includes circuitry that constantly monitors the contents of all time slots and, on detecting a continuous string of such logic levels, converts it to a predetermined code. On detecting such a code, each low-speed interface sends a fault-indication in a format which can be decoded by terminal systems.

However, each low-speed interface must be provided with decoder circuitry having powerful error detection and correction capabilities and precision timing control in order to perform the discrimination of specified logic levels from those of data signals and the conversion of the discriminated logic levels to the format of the terminal systems.

SUMMARY OF THE INVENTION

It is therefore an object of the present invention to provide a TDM demultiplexer at one of the TDM hierarchical levels that eliminates the need to provide precision logic level discrimination and powerful error detection and correction capabilities.

According to a broader aspect, the present invention provides a TDM demultiplexer for a channel bank at one of TDM hierarchical levels. The TDM demultiplexer comprises a plurality of high-speed interfaces connected respectively to high-speed digital transmission lines. Each of the interfaces receives a TDM digital signal from the transmission line, detects a line fault thereof and generates an alarm signal indicating the line fault. A plurality of low-speed interfaces greater in number than the number of the high-speed interfaces are associated respectively with low-speed transmission lines. Data channels are established between the outputs of the high-speed interfaces and the inputs of the low-speed interfaces for passing the data signals from the high-speed transmission lines to the low-speed transmission lines and maintenance channels are established therebetween for exclusively passing the alarm signals from the high-speed transmission lines to the low-speed transmission lines.

According to a specific aspect of the present invention, the TDM demultiplexer comprises a time division multiplexer for multiplexing the outputs of the high-speed interfaces into a first TDM frame sequence. A time slot interchanger provides interchanging of the time slots of data signals in the first TDM frame sequence according to prescribed relationships between the time slots of the high-speed transmission lines and those of low-speed transmission lines and generates therefrom a second TDM frame sequence. A time division demultiplexer is included for demultiplexing the second TDM frame sequence into plurality of TDM signals greater in number than the number of the high-speed interfaces. Each of the low-speed interfaces receives a respective one of the demultiplexed TDM signals from the time division demultiplexer and detects the time slot in which the alarm signal is contained and transmits a line fault signal to a respective one of the low-speed transmission lines.

BRIEF DESCRIPTION OF THE DRAWINGS

The present invention will be described in further detail with reference to the accompanying drawings, in which:

FIG. 2 is a block diagram of a primary-level TDM demultiplexer according to the present invention;

FIG. 3 is a block diagram of each line interface of FIG. 2; and

FIG. 4 is a block diagram of each low-speed interface of FIG. 2.

DETAILED DESCRIPTION

Figure 1:
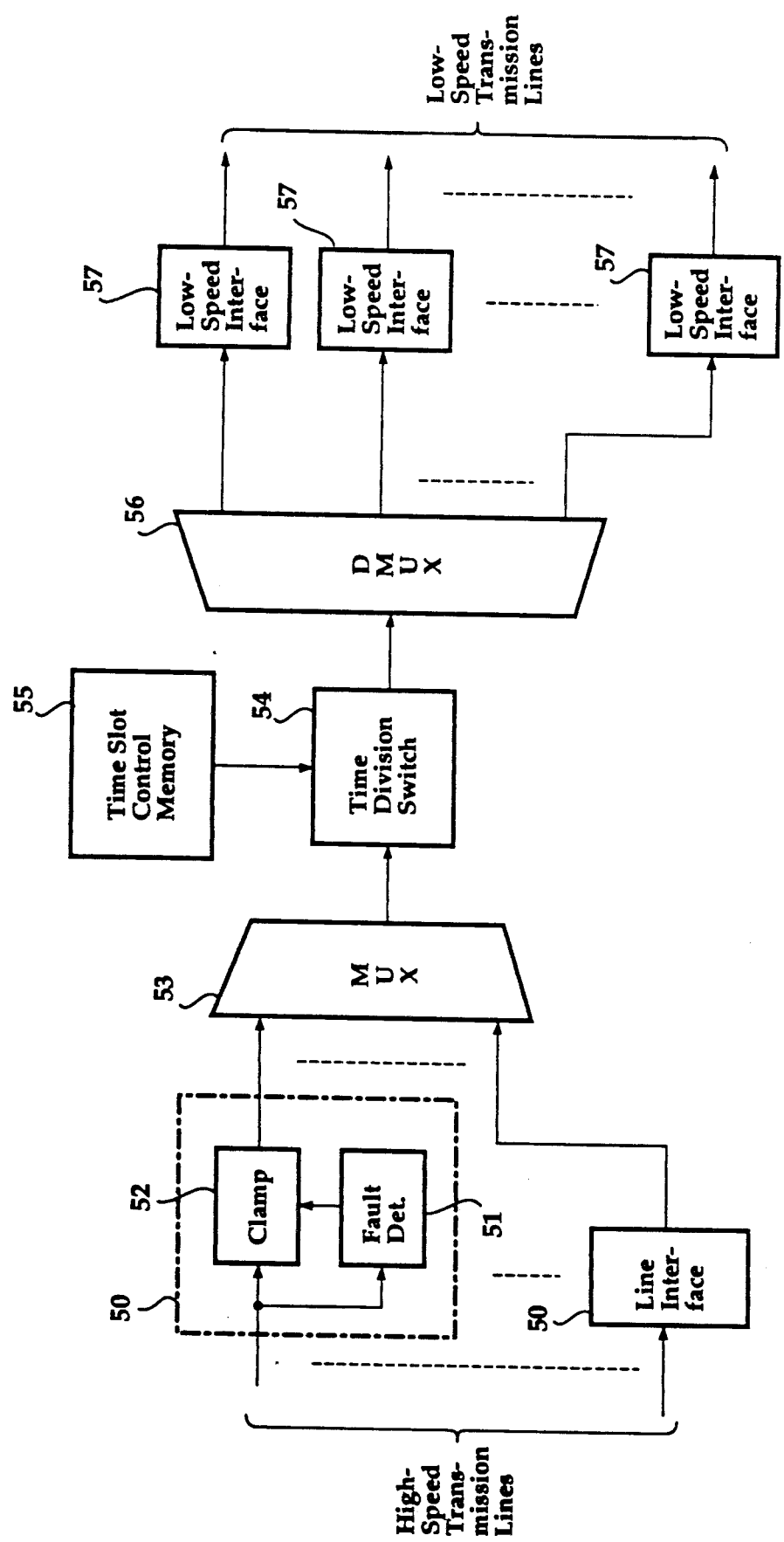
FIG. 1 is a block diagram of a prior art TDM demultiplexer at the primary level of the TDM hierarchy.

Referring now to FIG. 2, there is shown a TDM demultiplexer of the present invention for demultiplexing 1.544-Mbps digital signals, known as digital signals 1 (DS-1) to analog signals at the primary level of the TDM hierarchy. The DS-1 signals, each of which contains "24" DS-0 channels, are received by line interfaces 2-1 to 2-m through a plurality of high-speed digital circuits 1-1 to 1-m. Each of the line interfaces 2 includes a fault detection circuit to generate an 8-Kbps maintenance alarm signal which identifies faulty digital circuits for each of the 1.544-Mbps frames. Thus, one time slot is provided for "24" DS-0 channels. An address generator 3 supplies a high-speed address signal to all the line interfaces 1 to indicate which time slots of a TDM frame sequence on a highway 10a to insert data signals and which time slots to insert maintenance alarm signals. The outputs of line interfaces 1-1 through 1-m are supplied to a time division multiplexer 4 to which address signals are also supplied from the address generator 3. The data and maintenance time slots from line interfaces 1-1 to 1-m are multiplexed into a sequence of m frames and fed to a time division switch 5 with a capacity of 64-kbps, for example.

Time division switch 5 is responsive to a switching control signal from a time slot control memory 6 to interchange the time slots of each frame of the high-speed signals according to predetermined relationships established between the high-speed incoming lines and low-speed outgoing lines. The output of time switch 5 is then supplied through highway 10b to a demultiplexer 7 to which address signals are also supplied from the address generator 3 to demultiplex the slot-interchanged framed sequence into n individual frames for coupling to low-speed interfaces 8-1 through 8-n to which address signals are also supplied from the address generator 3 (where n is larger than m). The outputs of the low-speed interfaces 8-1 to 8-n are coupled respectively to low-speed transmission lines 9-1 through 90-n.

As shown in FIG. 3, each of the line interface circuits 2-1 to 2-m includes a sync detector 20 to which the associated high-speed line $1_i$ is connected. A timing generator 21 derives a timing signal to the sync detector 20 from the data bits on line $1_i$ for coupling to the sync detector 20 to allow it to discriminate between data signals and a frame sync. The discriminated data signals are fed to a buffer memory 22. A signal indicating whether the frame sync is correctly detected or not is also supplied from the sync detector 20 to an alarm generator 23. An interruption detector 24 is also connected to the line $1_i$ to detect that a disconnection occurs in the line and indicates this fact to alarm generator 23.

If an out-of-frame condition or a line disconnection occurs in the incoming digital line, alarm generator 23 generates a maintenance alarm signal, which is stored into the buffer 22. The address code supplied from the address generator 3 is translated by a decoder 25 into a signal indicating the time slots for the stored 1.536-Mbps data signals and a indicating the time slot for the stored 8-kbps alarm signal. These time slot indicating signals are fed to the buffer 22 so that the stored data and alarm signals are multiplexed into a single frame and supplied to the time division multiplexer 4.

In FIG. 4, each of the low-speed interfaces 8 includes a data buffer 30 and a alarm latch 31 to both of which the TDM frame sequence from demultiplexer 4 is supplied. A decoder 32 translates a low-speed address signal from address generator 3 into a data timing signal and an alarm timing signal and supplies them respectively to data buffer 30 and alarm latch 31 to separate data and alarm signals from each other for application to an alarm processor 33. Alarm processor 33 monitors the contents of each maintenance time slot of each demultiplexed frame and, on detecting that an alarm is set in a maintenance time slot, it sends a "busy" signal, instead of data signals, to the associated low-speed transmission line 9. Alarm processor 33 can be implemented with known simple circuitry such as AT&T trunkprocessor. Therefore, powerful error detection and correction circuitry with a high degree of timing precision are not required for each low-speed interface, while ensuring reliable transfer of maintenance alarm signals from high speed circuits to low speed circuits.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A TDM demultiplexer for a channel bank at one of several TDM hierarchical levels, comprising:

a plurality of high-speed interfaces connected respectively to high-speed digital transmission lines, each of said high-speed interfaces receiving TDM digital signals from the transmission line, detecting a line fault in said transmission line and generating an alarm signal indicating the line fault;

a plurality of low-speed interfaces which are greater in number than the number of said high-speed interfaces, said low-speed interfaces being respectively coupled to low-speed transmission lines; and means for establishing data channels between said high-speed interfaces and said low-speed interfaces for passing said data signals from said high-speed transmission lines to said low-speed transmission lines and for establishing maintenance channels between said high-speed interfaces and said low-speed interfaces for passing the alarm signals from said high-speed transmission lines to said low-speed transmission lines.

2. A TDM demultiplexer for a channel bank at one of several TDM hierarchical levels, comprising:

a plurality of high-speed interfaces connected respectively to high-speed digital transmission lines, each of said high-speed interfaces receiving TDM digital signals from the transmission line, detecting a line fault in said transmission line and appending an alarm signal having a time-slot duration indicating the line fault to time slots of said digital signals;

time division multiplexer means for multiplexing output signals from said high-speed interfaces into time slots of a first TDM frame sequence;

time slot interchanging means for interchanging the time slots of said first TDM frame sequence to produce a second TDM frame sequence according to prescribed relationships between the time slots of said high-speed transmission lines and those of low-speed transmission lines;

time division demultiplexer means for demultiplexing said second TDM frame sequence into a plurality of TDM signals which are greater in number than the number of said high-speed interfaces; and a plurality of low-speed interfaces for respectively receiving the demultiplexed TDM signals from said time division demultiplexer means, each of said low-speed interfaces detecting the time slot in which said alarm signal is contained and transmitting a line fault signal to a respective one of said low-speed transmission lines.

* * * * *